(12) United States Patent
Takeoka et al.

(10) Patent No.: US 9,785,882 B2
(45) Date of Patent: *Oct. 10, 2017

(54) WIRELESS COMMUNICATION DEVICE AND ARTICLE INCLUDING THE SAME

(71) Applicant: Murata Manufacturing Co., Ltd., Nagaokakyo-shi, Kyoto-fu (JP)

(72) Inventors: Makoto Takeoka, Nagaokakyo (JP); Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,961

(22) Filed: Mar. 20, 2017

(65) Prior Publication Data

US 2017/0193346 A1      Jul. 6, 2017

Related U.S. Application Data

(63) Continuation of application No. 15/165,021, filed on May 26, 2016, now Pat. No. 9,639,801, which is a continuation of application No. PCT/JP2014/080188, filed on Nov. 14, 2014.

(30) Foreign Application Priority Data

Nov. 29, 2013   (JP) .................................. 2013-248135

(51) Int. Cl.
*G06K 19/077*       (2006.01)

(52) U.S. Cl.
CPC . *G06K 19/07784* (2013.01); *G06K 19/07777* (2013.01)

(58) Field of Classification Search
None
See application file for complete search history.

(56) References Cited

PUBLICATIONS

Takeoka et al., "Wireless Communication Device and Article Including the Same", U.S. Appl. No. 15/165,021, filed May 26, 2016.

*Primary Examiner* — Kristy A Haupt
(74) *Attorney, Agent, or Firm* — Keating & Bennett, LLP

(57) ABSTRACT

A wireless communication device includes an antenna resonance circuit and a wireless IC element. The antenna resonance circuit includes a loop-shaped antenna that performs wireless communication by generating a magnetic field and series inductors connected in series to the loop-shaped antenna. The antenna resonance circuit has a resonant frequency corresponding to a carrier frequency. The wireless IC element is connected to the antenna resonance circuit and processes transmission and reception signals. An inductance value of the series inductors is larger than an inductance value of the loop-shaped antenna, and the series inductors are covered with a magnetic material.

8 Claims, 8 Drawing Sheets

WIRELESS COMMUNICATION DEVICE AND ARTICLE INCLUDING THE SAME

BACKGROUND OF THE INVENTION

1. Field of the Invention

The present invention relates to a wireless communication device, for example, a wireless communication device usable in a contactless communication system such as an RFID (Radio Frequency Identification) system and an article including the same.

2. Description of the Related Art

To date, an IC tag described in Japanese Unexamined Patent Application Publication No. 2004-126750 has been known as an IC tag used in a contactless communication system. Since the IC tag of this type has an antenna and an IC module that are directly connected to each other, the impedance of the antenna itself needs to be set to correspond to the complex conjugate of the impedance of the IC module. Accordingly, if there are different ICs or different shapes for the antenna, the antenna of a contactless IC tag needs to be designed according to specific characteristics of the IC or the shape of the antenna. In addition, evaluation is generally performed by using a measurement system based on 50Ω. These factors cause a problem of a very high degree of design difficulty. Moreover, for example, if a metal object is disposed adjacent to the antenna, the impedance of the antenna itself changes, and the frequency characteristic of the IC tag is thus prone to change.

SUMMARY OF THE INVENTION

Preferred embodiments of the present invention provide a wireless communication device that achieves a small change in a frequency characteristic and in which a degree of difficulty in designing an antenna is significantly reduced, and also provide an article including the wireless communication device.

According to a first preferred embodiment of the present invention, a wireless communication device including an antenna resonance circuit including a loop-shaped antenna that performs wireless communication by generating a magnetic field and a series inductor connected in series to the loop-shaped antenna, the antenna resonance circuit having a resonant frequency corresponding to a carrier frequency, and a wireless IC element that is connected to the antenna resonance circuit and that processes transmission and reception signals.

An inductance value of the series inductor is larger than an inductance value of the loop-shaped antenna, and the series inductor is covered with a magnetic material.

According to a second preferred embodiment of the present invention, an article includes the wireless communication device according to the first preferred embodiment of the present invention and a metal body disposed adjacent to the loop-shaped antenna.

In the wireless communication device, the circuits of an antenna section that performs wireless communication and a resonance circuit section that adjusts a resonant frequency are separated based on the function thereof, the inductance value of the resonance circuit section is set larger than the inductance value of the antenna section, and the resonance circuit section having the larger inductance value is covered with a magnetic material. Accordingly, even if the impedance characteristic of the antenna section is changed depending on the environment or the like of the wireless communication device, the frequency characteristic of the device is not changed easily. In addition, even if a metal plate or the like is located close to the antenna section, communication is still able to be performed. Further, the size, shape, or the like of the antenna section is able to be designed easily. For example, the antenna section including a conductor pattern with even one turn allows communication and does not necessarily have to have a spiral shape to increase an antenna length.

According to various preferred embodiments of the present invention, a wireless communication device that achieves a small change in a frequency characteristic and a low degree of difficulty in designing an antenna is realized.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 9A and 9B illustrate an article (pedometer) including the wireless communication device, in which FIGS. 9A and 9B are respectively an external perspective view and a perspective view schematically illustrating an inner structure.

DETAILED DESCRIPTION OF THE PREFERRED EMBODIMENTS

Figure 1A:
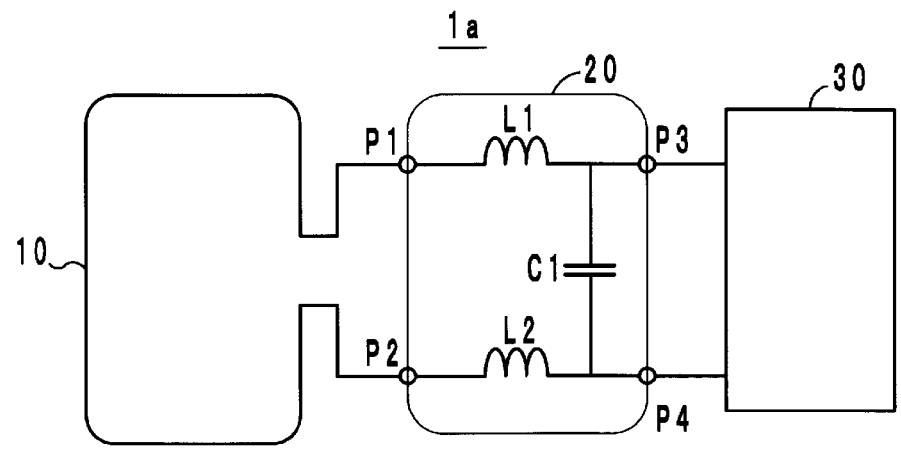
FIGS. 1A-1C are equivalent circuit diagrams illustrating a basic circuit of a wireless communication device, in which FIGS. 1A, 1B, and 1C respectively illustrate a first example, a second example, and a third example of a preferred embodiment of the present invention.

Hereinafter, preferred embodiments of a wireless communication device according to the present invention and an article including the device will be described with reference to the accompanying drawings. Note that common components and portions in each drawing are denoted by the same reference numerals, and repeated explanation is omitted.

Figure 1B:
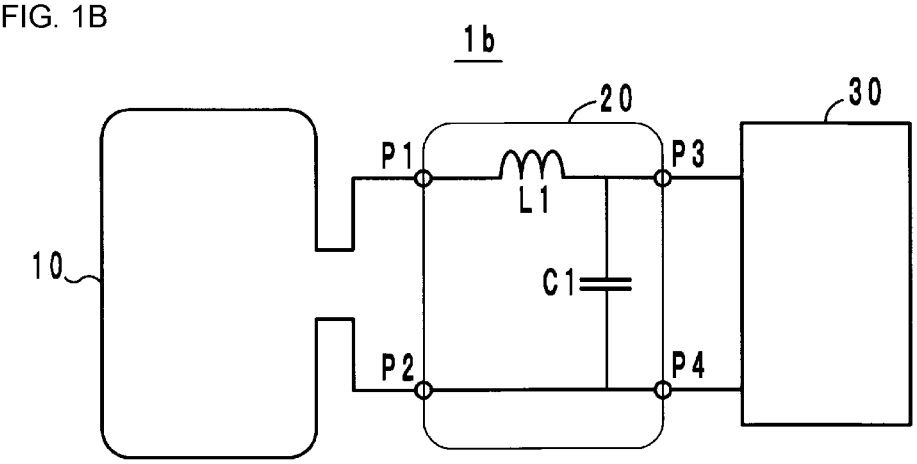
Figure 1C:
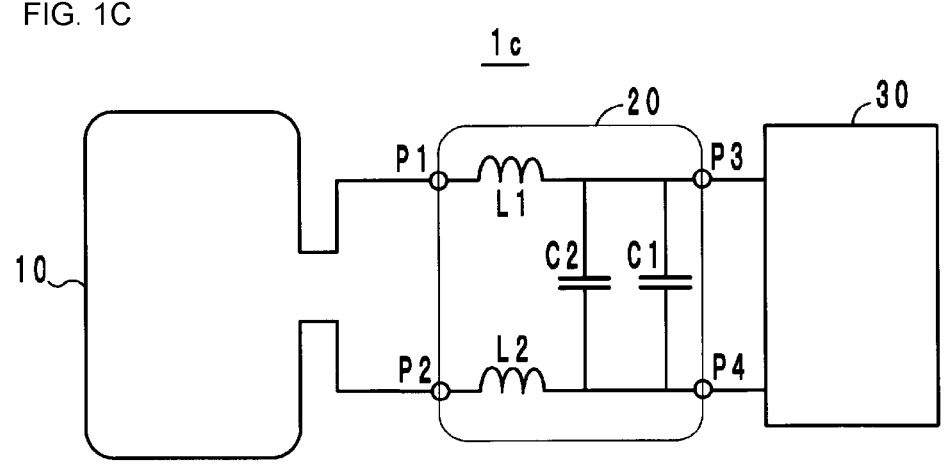
Figure 2A:
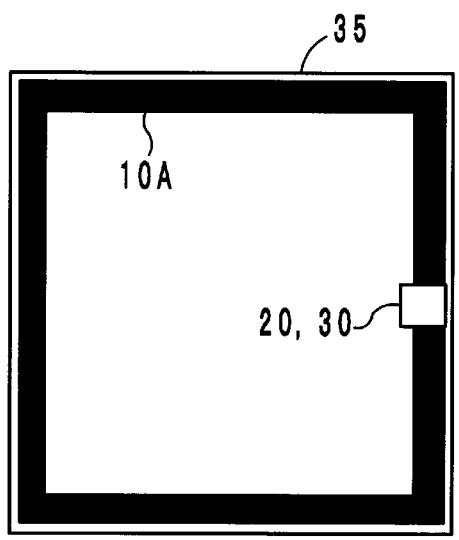
FIGS. 2A-2D are plan views illustrating various shapes and sizes of a loop-shaped antenna according to a preferred embodiment of the present invention.
Figure 2B:
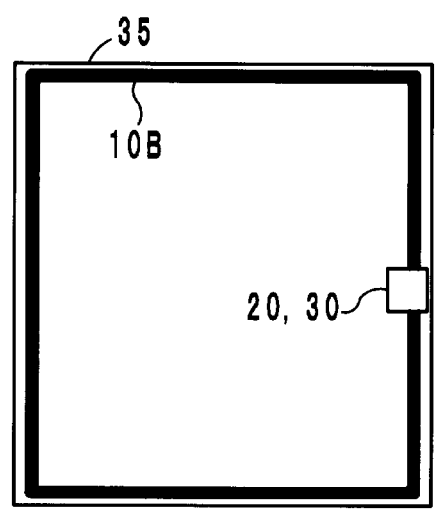
Figure 2C:
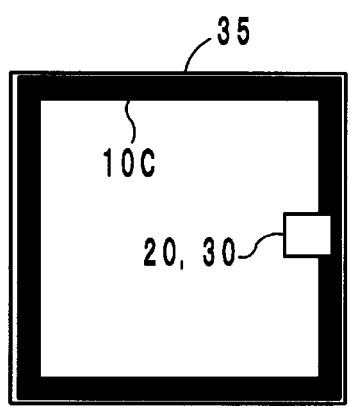
Figure 2D:
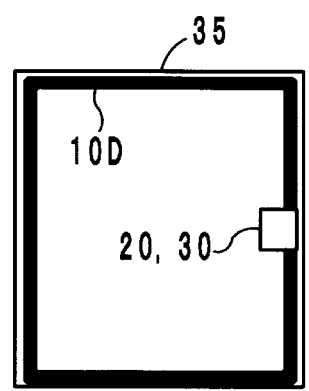

FIGS. 1A-1C respectively illustrate a first example, a second example, and a third example of a wireless communication device. The example wireless communication devices preferably are RFIDs device for a HF-band RFID system using a HF band as a carrier frequency.

A wireless communication device 1a that is the first example includes an antenna resonance circuit and a wireless IC element 30, the antenna resonance circuit including a loop-shaped antenna 10 that performs wireless communication by generating a magnetic field and a frequency adjustment auxiliary circuit 20 for antenna, the wireless IC element 30 processing transmission and reception signals. The frequency adjustment auxiliary circuit 20 for antenna includes series inductors L1 and L2 and a capacitor C1, the series inductors L1 and L2 being connected in series to the loop-shaped antenna 10, the capacitor C1 being disposed between the series inductors L1 and L2 and being connected in series to the series inductors L1 and L2. The resonance circuit including an L component of the loop-shaped antenna 10, the series inductors L1 and L2, and the capacitor C1 (strictly speaking, the resonance circuit further including a stray capacitance component of the wireless IC element 30) has a resonant frequency corresponding to the carrier frequency. The frequency adjustment auxiliary circuit 20 for antenna has a resonant frequency that preferably is about 15% above or below the carrier frequency, for example. Ports P1 and P2 of the frequency adjustment auxiliary circuit 20 for antenna are respectively connected to end portions of the loop-shaped antenna 10, and ports P3 and P4 are respectively connected to two input/output terminals of the wireless IC element 30. Further, as will be described later, the inductance value of the series inductors L1 and L2 is larger than the inductance value of the loop-shaped antenna 10, and the series inductors L1 and L2 are covered with a magnetic material (will be in detail described with reference to FIGS. 4 and 5).

In the second example, as illustrated in FIG. 1B, the frequency adjustment auxiliary circuit 20 for antenna is provided with the inductor L1 as a single inductor. In other words, a wireless communication device 1b in the second example includes the series inductor L1 connected in series to the loop-shaped antenna 10 and the frequency adjustment auxiliary circuit 20 for antenna including the capacitor C1 connected in series to the series inductor L1.

In the third example, as illustrated in FIG. 1C, the capacitor C1 and a capacitor C2 are connected in parallel to each other. The capacitor C2 is disposed to correct the capacitance value of the capacitor C1. In other words, a wireless communication device 1c in the third example includes the series inductors L1 and L2 connected in series to the loop-shaped antenna 10 and the frequency adjustment auxiliary circuit 20 for antenna including the capacitors C1 and C2 that are connected in parallel to each other.

The loop-shaped antenna 10 includes a conductor pattern having one turn and may adopt various shapes and sizes illustrated in, for example, FIGS. 2A-2D. An antenna 10A illustrated in FIG. 2A includes a conductor pattern defining an approximately 48 mm square, for example. The width of the pattern preferably is about 5 mm, and the inductance value of the antenna 10A preferably is about 200 nH, for example. An antenna 10B illustrated in FIG. 2B includes a conductor pattern forming an approximately 48 mm square, for example. The width of the pattern preferably is about 1 mm, and the inductance value of the antenna 10B preferably is about 200 nH, for example. An antenna 10C illustrated in FIG. 2C includes a conductor pattern defining an approximately 38 mm square, for example. The width of the pattern preferably is about 5 mm, and the inductance value of the antenna 10C preferably is about 170 nH, for example. An antenna 10D illustrated in FIG. 2D includes a conductor pattern defining an approximately 38 mm square, for example. The width of the pattern preferably is about 1 mm, and the inductance value of the antenna 10D preferably is about 170 nH, for example. The frequency adjustment auxiliary circuit 20 for antenna is connected to both end portions of a corresponding one of the conductor patterns.

Note that reference numeral 35 in FIGS. 2A-2D denotes a base material sheet that holds a corresponding one of the antennas 10A to 10D.

Figure 3:
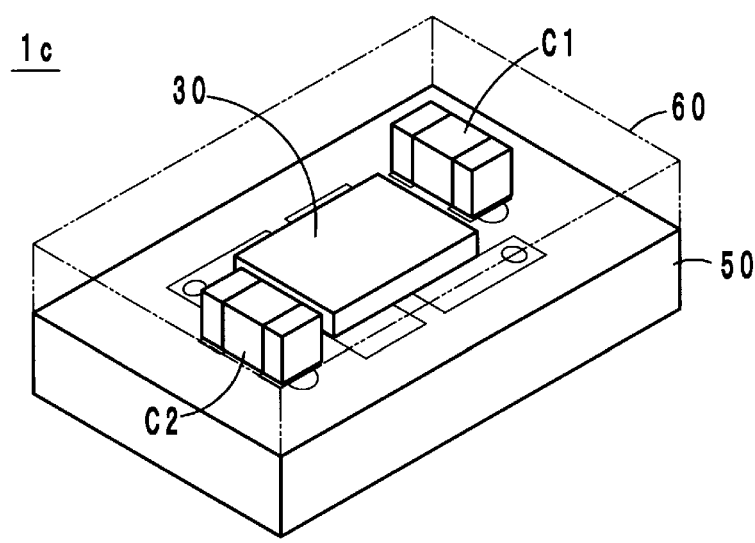
FIG. 3 is a perspective view illustrating the third example of the wireless communication device according to a preferred embodiment of the present invention.
Figure 4:
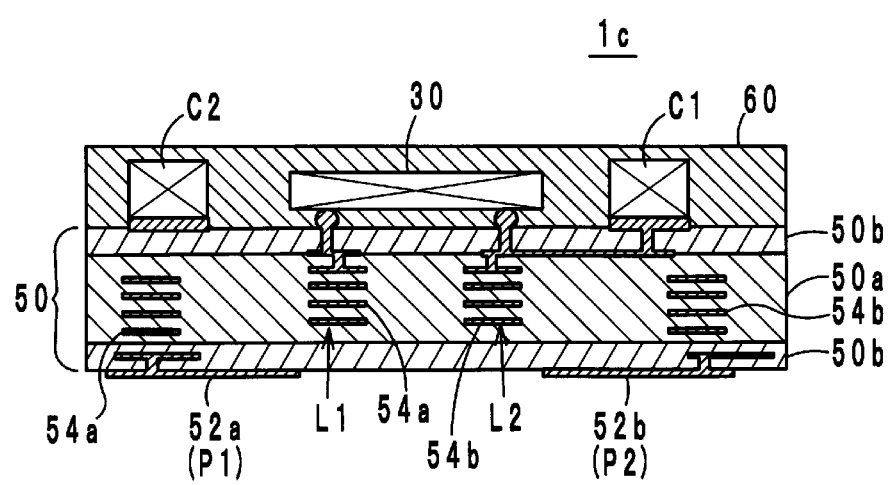
FIG. 4 is a cross-sectional view illustrating the third example according to a preferred embodiment of the present invention.

In the wireless communication device 1c having the circuit configuration described above as the third example, the wireless IC element 30 and the capacitors C1 and C2 of a chip type are mounted on a substrate 50 defined by a magnetic layer including the series inductors L1 and L2 therein and are encapsulated by the resin 60, as illustrated in FIGS. 3 and 4. The substrate 50 preferably has a laminated structure in which a magnetic layer 50a is sandwiched by non-magnetic layers 50b disposed above and below the magnetic layer 50a. Note that the series inductors L1 and L2 included in the magnetic layer 50a may be magnetically coupled to each other. Magnetically coupling the series inductors L1 and L2 to each other enables not only further reduction in the change of an L value caused by an external environment but also downsizing of the series inductors L1 and L2 that utilizes a mutual inductance M.

Figure 5:
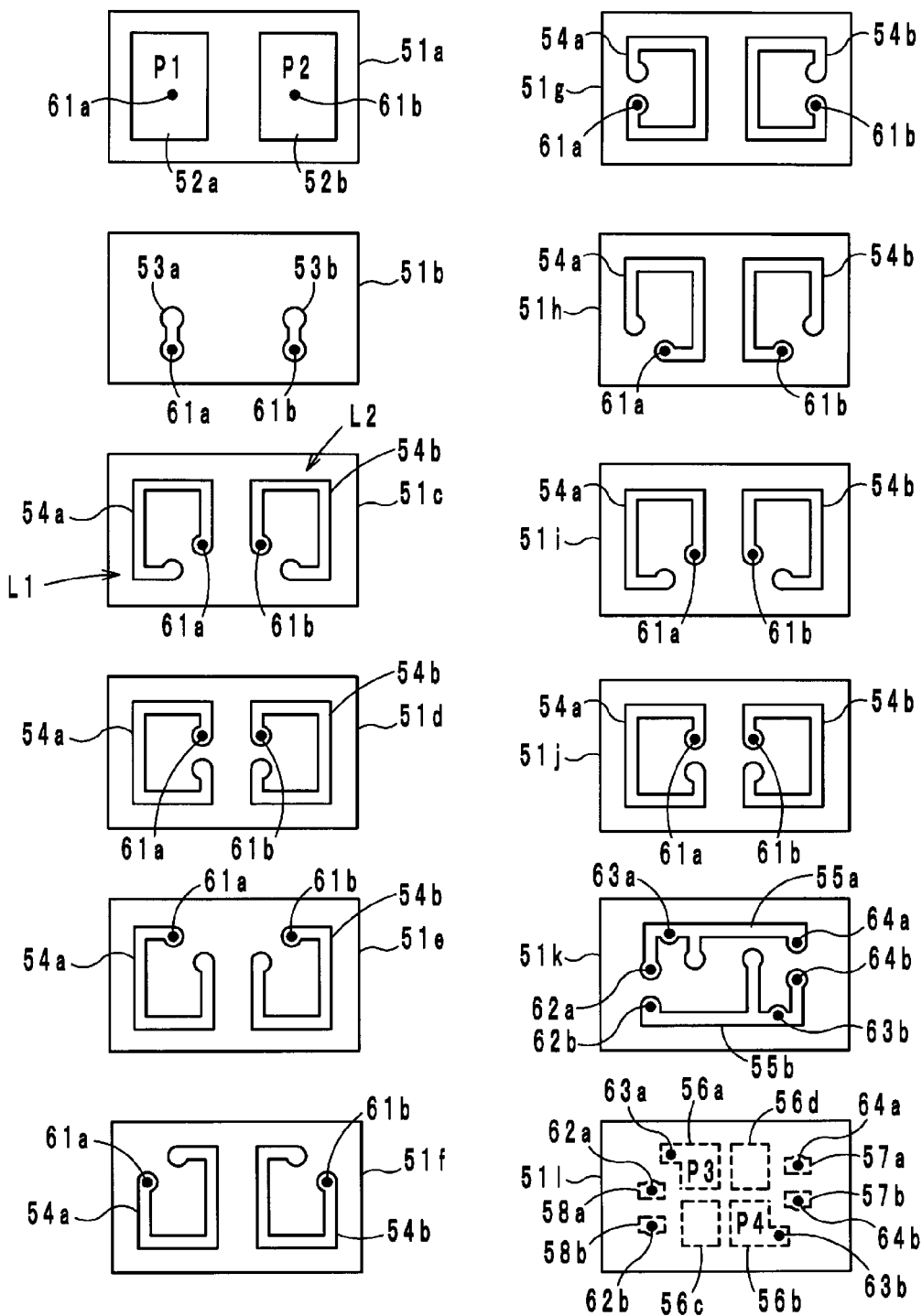
FIG. 5 is a plan view illustrating the laminated structure of the third example according to a preferred embodiment of the present invention in an exploded manner.

Hereinafter, electrodes and the conductor pattern of the series inductors L1 and L2 and the like incorporated in the substrate 50 will be described with reference to FIG. 5. FIG. 5 illustrates sheets 51a to 51l that are formed of a non-magnetic material and the magnetic material in a state where the sheets 51a to 51l are viewed from the bottom of the substrate 50 (see FIG. 4).

Back-surface-side electrodes 52a and 52b and via hole conductors 61a and 61b are provided on and in the sheet 51a, and relay patterns 53a and 53b and the via hole conductors 61a and 61b are provided on and in the sheet 51b. Conductor patterns 54a and 54b and the via hole conductors 61a and 61b are provided on and in each of the sheets 51c to 51j. Relay patterns 55a and 55b and via hole conductors 62a, 62b, 63a, 63b, 64a, and 64b are provided on and in the sheet 51k. Front-surface-side electrodes 56a to 56d, 57a, 57b, 58a, and 58b and the via hole conductors 62a, 62b, 63a, 63b, 64a, and 64b are provided on and in the sheet 51l.

The electrodes 52a and 52b (ports P1 and P2) on the lowermost layer are respectively connected to the conductor patterns 54a and 54b with the via hole conductors 61a and 61b and the relay patterns 53a and 53b interposed therebetween. The plurality of conductor patterns 54a are connected to each other in a coiled manner with the via hole conductor 61a interposed therebetween and define the series inductor L1. The plurality of conductor patterns 54b are connected to each other in a coiled manner with the via hole conductor 61b interposed therebetween and define the series inductor L2.

The conductor pattern 54a located uppermost on the inductor L1 is connected to the relay pattern 55a with the via hole conductor 61a interposed therebetween. The relay pattern 55a is connected to the electrode 58a on the uppermost layer with the via hole conductor 62a interposed therebetween, to the electrode 56a on the uppermost layer with the via hole conductor 63a interposed therebetween, and to the electrode 57a on the uppermost layer with the via hole conductor 64a interposed therebetween. The relay pattern 55b is connected to the electrode 58b on the uppermost layer with the via hole conductor 62b interposed therebetween, to the electrode 56b on the uppermost layer with the via hole conductor 63b interposed therebetween, and to the electrode 57b on the uppermost layer with the via hole conductor 64b interposed therebetween.

The input/output terminals of the wireless IC element 30 are connected to the electrodes 56a and 56b (ports P3 and P4) on the sheet 51l that is the uppermost layer with solder bumps or the like interposed therebetween. The capacitor C1 is connected to the electrodes 57a and 57b, and the capacitor C2 is connected to the electrodes 58a and 58b.

Subsequently, the return loss characteristics of a wireless communication device will be described with reference to FIG. 6A. The return loss characteristics are obtained by performing simulation on the wireless communication device 1a illustrated in FIG. 1A in such a manner that the inductance values of the series inductors L1 and L2 are each preferably set to about 390 nH, the capacitance value of the capacitor C1 preferably is set to about 120 pF, and an antenna having a conductor pattern defining an approximately 40 mm square, a pattern width of about 1 mm, and an inductance value of about 200 nH preferably is used as the loop-shaped antenna 10, for example.

Figure 6A:
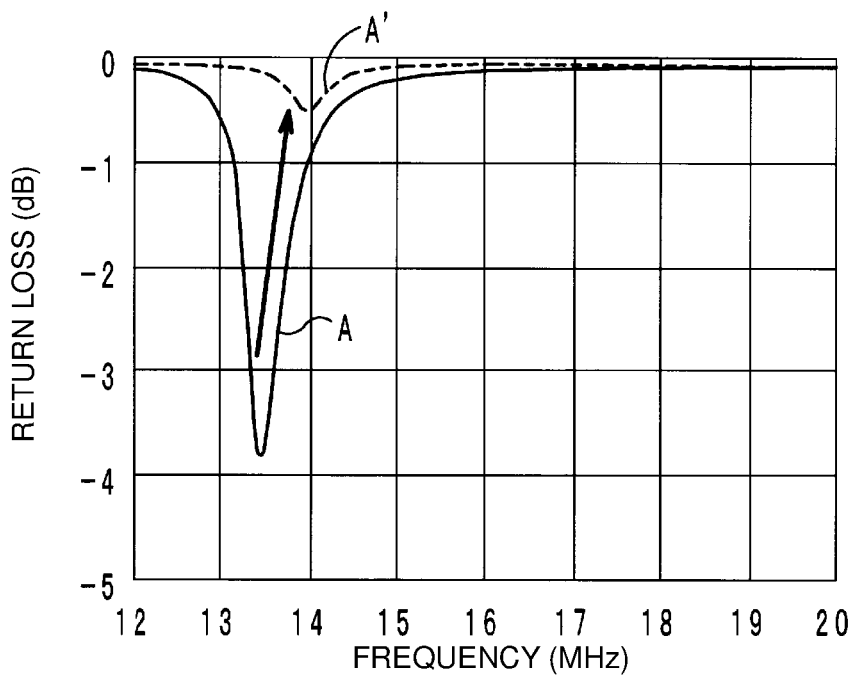
FIGS. 6A and 6B are graphs illustrating a first characteristic, in which FIGS. 1A and 1B respectively illustrate an example of preferred embodiments of the present invention and a comparative example.
Figure 6B:
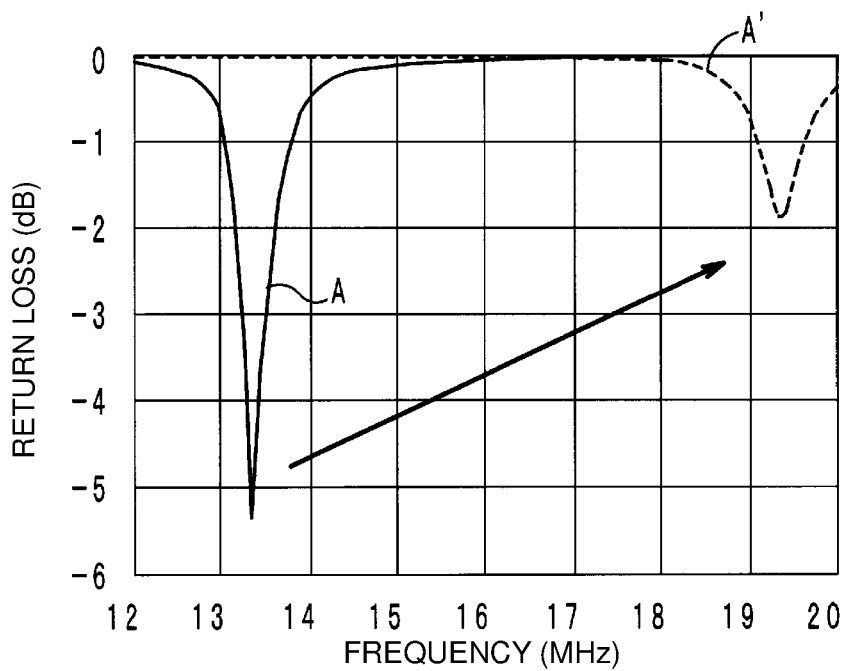

A curve A in FIG. 6A represents a return loss characteristic observed when a metal plate is not close to the antenna 10 and the wireless communication device 1a (resonant frequency: about 13.4 MHz), and a curve A' represents a return loss characteristic observed when a metal plate is close to and 2 mm from the antenna 10 (resonant frequency: about 13.9 MHz). As seen from the curves A and A', even in the case of an approximately 2 mm proximity of the metal plate, the change range of the resonant frequency is about 500 kHz (the allowance value of the change range is approximately 1 MHz or less), for example. In contrast, in a comparative example in which the frequency adjustment auxiliary circuit 20 for antenna is not disposed (the frequency adjustment auxiliary circuit 20 for antenna is omitted in a wireless communication device 1), as illustrated using the curves A and A' in part (B) of FIG. 6, the resonant frequency observed in the case of proximity of the metal plate is changed to 19.4 MHz, and the change range is 6 MHz. In this example, communication is not possible.

As described above, in the wireless communication device, the circuits of the loop-shaped antenna that perform wireless communication and the auxiliary circuit that adjusts the resonant frequency are separated based on the function. The inductance value of the auxiliary circuit is set larger than the inductance value of the antenna, and the series inductors L1 and L2 are covered with the magnetic layer. Accordingly, even if the characteristic of the antenna is changed depending on the environment or the like of the wireless communication device, the frequency characteristic of the wireless communication device is not changed easily. In addition, even if a metal plate is located close to the antenna, the frequency change range is small, and communication is able to be performed sufficiently.

Further, the size, shape, or the like of the antenna is able to be designed easily regardless of the impedance (see FIGS. 2A-2D). The antenna including a conductor pattern with even one turn allows communication and does not necessarily have to have a spiral shape to increase an antenna length.

Subsequently, a result of simulation of a distance of reading performed by a reader-writer in the case of proximity of a metal plate will be described. A case of using a loop-shaped antenna 10D illustrated in FIG. 2D for the wireless communication device 1a is herein described. The reading distance is normally about 57 mm, for example. Even when the metal plate is located close to and about 2 mm from the antenna 10, a reading distance of about 24 mm is ensured. In addition, in a case of using a loop-shaped antenna 10B illustrated in FIG. 2B, the reading distance is normally about 54 mm, for example. Even when the metal plate is located close to and about 2 mm from the antenna 10, a reading distance of about 32 mm is ensured, for example.

In contrast, in the comparative example in which the frequency adjustment auxiliary circuit 20 for antenna is not disposed (the frequency adjustment auxiliary circuit 20 for antenna is omitted in the wireless communication device 1a), the reading distance is normally 64 mm, but reading fails in the case of the proximity of 2 mm of the metal plate.

Figure 7:
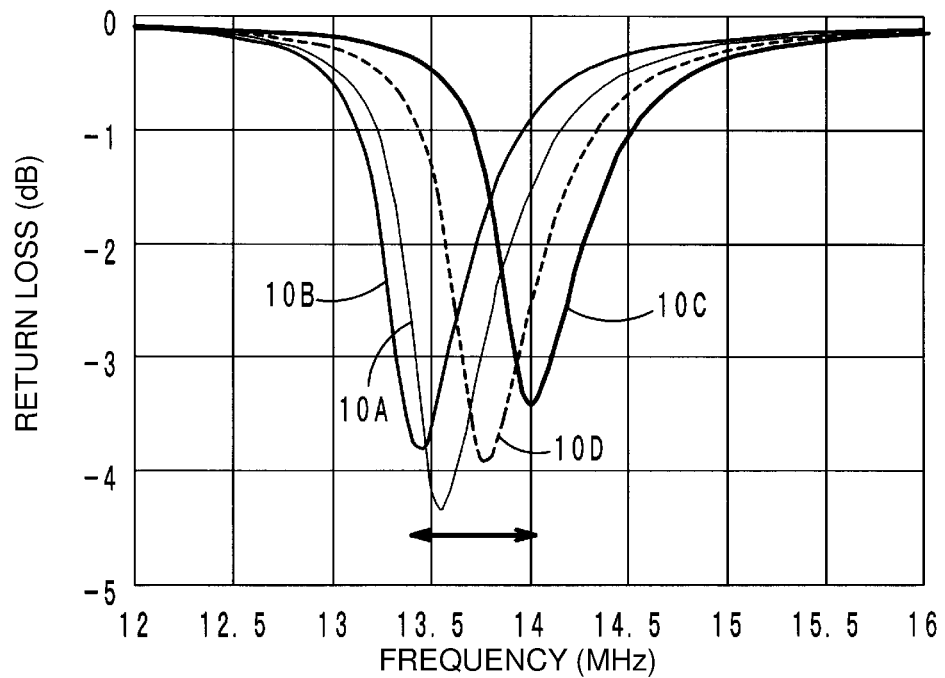
FIG. 7 is a graph illustrating another characteristic of an example of preferred embodiments of the present invention.

Subsequently, FIG. 7 illustrates return loss characteristics each of which is observed when a corresponding one of the loop-shaped antennas 10A to 10D illustrated in FIG. 2 is used in the wireless communication device 1a. The lowest resonant frequency is observed when the antenna 10B is used. The highest resonant frequency is observed when the antenna 10C is used. The maximum change range falls within approximately ±300 kHz, for example. The combined inductance value of the frequency adjustment auxiliary circuit 20 for antenna is preferably set to about 780 nH, and the combined inductance value of about 780 nH is about 4.59 times as large as the inductance value of about 170 nH of each of the loop-shaped antennas 10C and 10D, for example. In addition, the combined inductance value of about 780 nH is about 3.9 times as large as the inductance value of about 200 nH of each of the loop-shaped antennas 10A and 10B, for example. Accordingly, in the wireless communication device 1, the combined inductance value of the series inductors L1 and L2 is preferably about 3.9 times or more as large as the inductance value of the loop-shaped antenna 10, for example.

Figure 8:
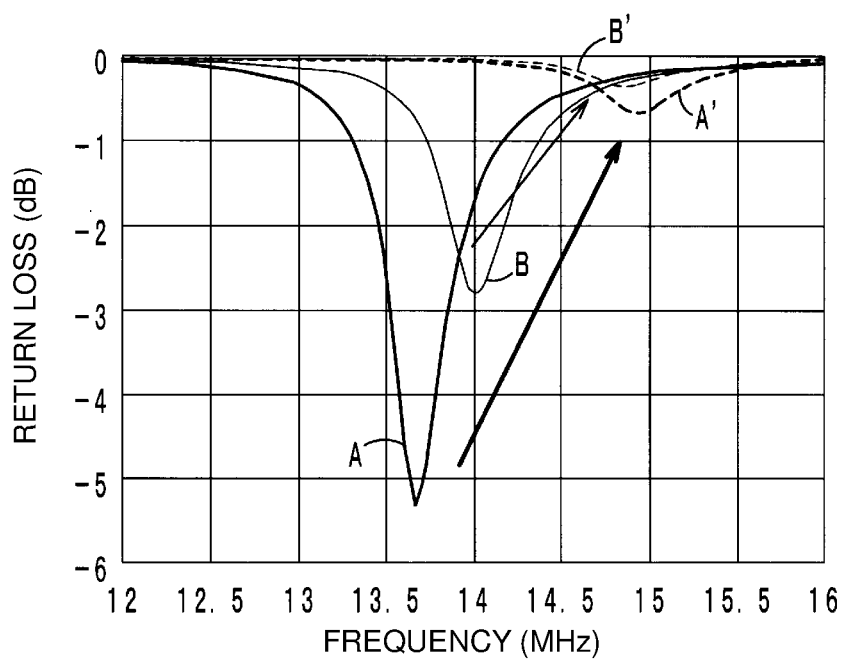
FIG. 8 is a graph illustrating still another characteristic of an example of preferred embodiments of the present invention.

Subsequently, FIG. 8 illustrates change characteristics of a resonant frequency observed when a metal plate is close to the communication device 1 and when the metal plate is far from the communication device 1. The communication device 1 includes the series inductors L1 and L2 of the frequency adjustment auxiliary circuit 20 for antenna that are each preferably set to about 100 nH (the combined inductance value is 200 nH) and the capacitor C1 is preferably set to about 390 pF+about 33 pF, for example. The antennas 10A and 10B (see FIGS. 2A and 2B) each preferably having the inductance value of about 200 nH and the antennas 10C and 10D (see FIGS. 2C and 2D) each preferably having the inductance value of about 170 nH, for example, preferably are used as the loop-shaped antenna.

In FIG. 8, curves A and A' represent resonant frequency characteristics observed when each of the antennas 10A and 10B is used. The curve A represents a resonant frequency characteristic observed in a normal state, and the curve A' represents a resonant frequency characteristic observed when a metal plate is close to and about 2 mm from a corresponding one of the antennas 10A and 10B. In this case, the resonant frequency is changed from about 13.5 MHz to about 14.7 MHz, and the change range is about 1 MHz, for example. Incidentally, the combined inductance value of the series inductors is one time as large as the inductance value of the loop-shaped antenna. In addition, curves B and B' represent resonant frequency characteristics observed when each of the antennas 10C and 10D is used. The curve B represents the resonant frequency characteristic observed in a normal state, and the curve B' represents the resonant frequency characteristic observed when the metal plate is close to and about 2 mm from a corresponding one of the antennas 10C and 10D. In this case, the resonant frequency is changed from about 14.0 MHz to about 14.7 MHz, and the change range is about 700 kHz, for example. Incidentally, the combined inductance value of the series inductors is about 1.17 times as large as the inductance value of the loop-shaped antenna. In the wireless communication device 1, the inductance value of the series inductors L1 and L2 is preferably about 1.2 times or more as large as the inductance value of the loop-shaped antenna 10, for example.

If the wireless communication device 1 includes the loop-shaped antenna 10 including a conductor pattern having one turn, the wireless communication device 1 can perform communication with a reader-writer or the like despite arrangement of a metal body close to the antenna 10. Accordingly, the wireless communication device 1 can be incorporated in various articles.

Figure 9A:
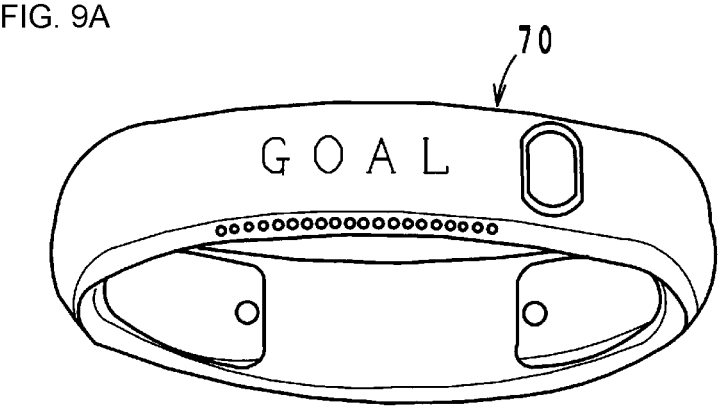
Figure 9B:
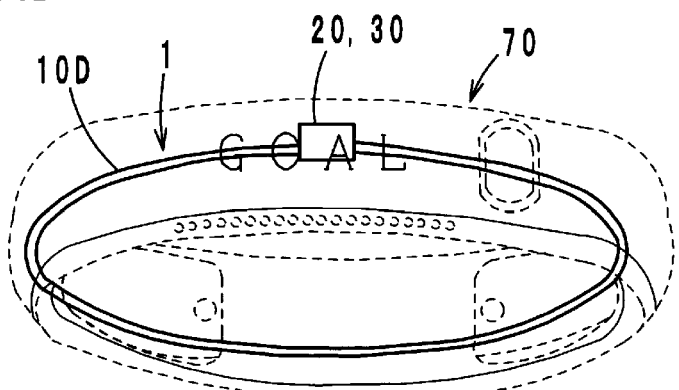

FIGS. 9A and 9B illustrate an activity monitor (a pedometer 70) including the wireless communication device 1 incorporated therein. The activity monitor represented by the pedometer 70 is a health product worn by a person to measure a daily quantity of motion, calories consumed, and the like. Light-weight activity monitors such as a bracelet activity monitor have become popular in recent years. To transfer measured data from the pedometer 70 to a personal computer or a smartphone through wireless communication using Bluetooth (trademark), W-LAN, or the like and to check the data, pairing between devices (a device authentication function) is required. However, pairing based on Bluetooth or the like is troublesome.

Hence, the wireless communication device 1 may be incorporated in an article such as the pedometer 70 by using a metal body of a loop shape having one turn (a metal wire 10D) as the loop-shaped antenna. This enables communication between the pedometer 70 and a mobile terminal or the like by using an RFID system or the like having an I$^2$C function. If a metal body is disposed in the pedometer 70, and even if the metal body is located close to the wire 10D, communication is able to be performed as a matter of course.

Figure 10:
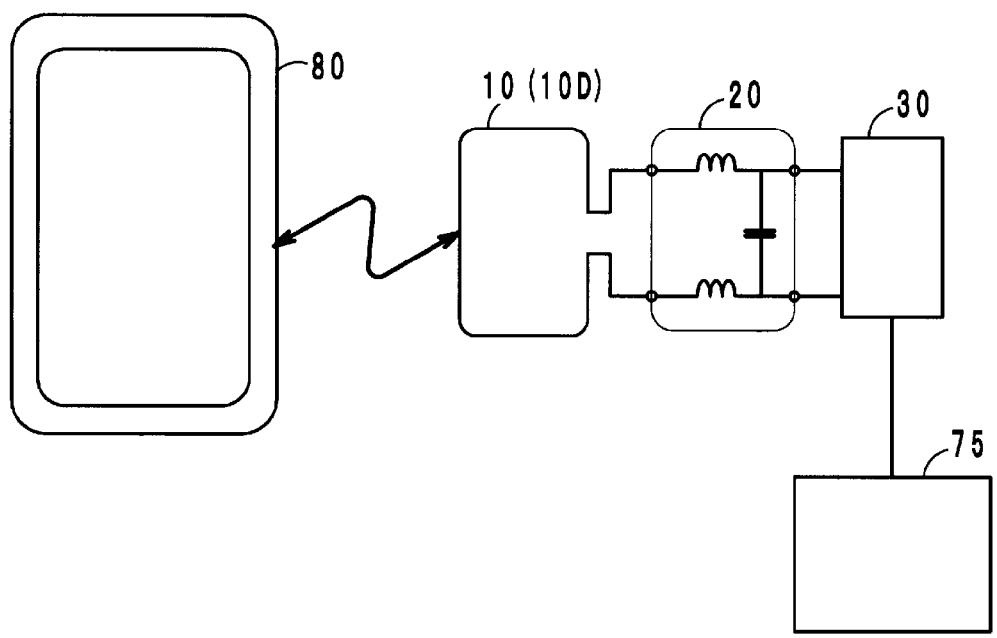
FIG. 10 is an explanatory view illustrating the state of communication between the wireless communication device and a mobile terminal.

Further, as illustrated in FIG. 10, if the wireless IC element 30 is connected to a microcomputer 75 incorporated in the pedometer 70, not only pairing but also transferring data (the number of steps, calories consumed, and the like) stored in the microcomputer 75 to a smartphone 80 through the loop-shaped antenna 10 (the wire 10D) is able to be performed.

Figure 11:
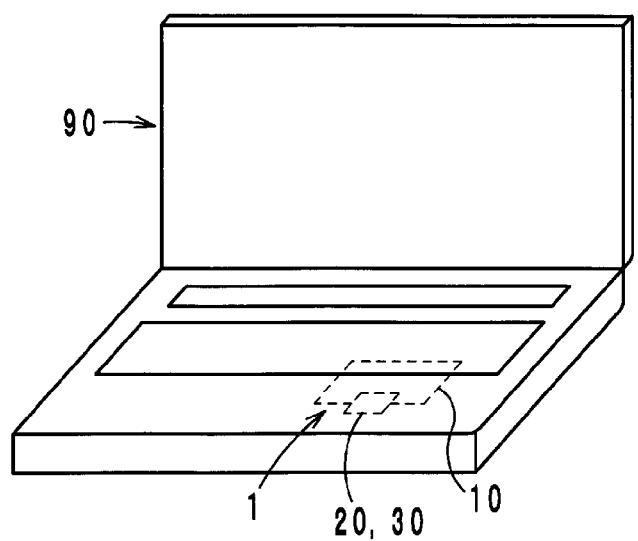
FIG. 11 is an explanatory view illustrating an article (personal computer) including the wireless communication device.

The wireless communication device 1 including the loop-shaped antenna 10 is provided, instead of a barcode provided in the related art, on the bottom of the metal housing of a personal computer 90 illustrated in FIG. 11. This enables management of the personal computer 90 by using the wireless communication device 1. In addition, connecting a microcomputer of the personal computer 90 to the wireless IC element 30 enables pairing and data exchange between the personal computer 90 and a host computer.

Other Preferred Embodiments

Note that the wireless communication device and the article according to the present invention are not limited to the preferred embodiments and can be modified in various ways without departing from the gist of the present invention.

In particular, any configuration, any shape, and the like of the details of the conductor pattern included in the loop-shaped antenna may be used. In addition, the wireless communication device is able to be incorporated widely in various articles other than the pedometer and the personal computer.

As described above, preferred embodiments of the present invention are useful for the wireless communication device and are excellent, in particular, in that there is a small change in the frequency characteristic and that the degree of difficulty in designing an antenna is significantly decreased.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An article comprising:
   a wireless communication device; and
   a metal housing; wherein
   the wireless communication device includes:
      an antenna resonance circuit including a loop-shaped antenna that performs wireless communication by generating a magnetic field, and a series inductor connected in series to the loop-shaped antenna, the antenna resonance circuit having a resonant frequency corresponding to a carrier frequency; and
      a wireless IC element that is connected to the antenna resonance circuit and that processes transmission and reception signals;
   an inductance value of the series inductor is larger than an inductance value of the loop-shaped antenna;
   the series inductor includes a plurality of conductor patterns connected to each other in a coiled manner within a magnetic material; and
   the loop-shaped antenna is provided in the metal housing.

2. The article according to claim 1, wherein the article is a computer.

3. The article according to claim 1, wherein the inductance value of the series inductor is about 1.2 times or more as large as the inductance value of the loop-shaped antenna.

4. The article according to claim 1, wherein the inductance value of the series inductor is about 3.9 times or more as large as the inductance value of the loop-shaped antenna.

5. The article according to claim 1, wherein the loop-shaped antenna is a one-turned loop-shaped antenna.

6. The article according to claim 5, wherein the loop-shaped antenna includes a conductor pattern having one turn.

7. The article according to claim 5, wherein the loop-shaped antenna includes a wire having one turn.

8. The article according to claim 1, wherein the loop-shaped antenna is provided on a bottom of the metal housing.

* * * * *